J. DAIN.
ROTARY HAY RAKE.
APPLICATION FILED JAN. 17, 1916.
1,283,475.
Patented Nov. 5, 1918.
2 SHEETS—SHEET 1.
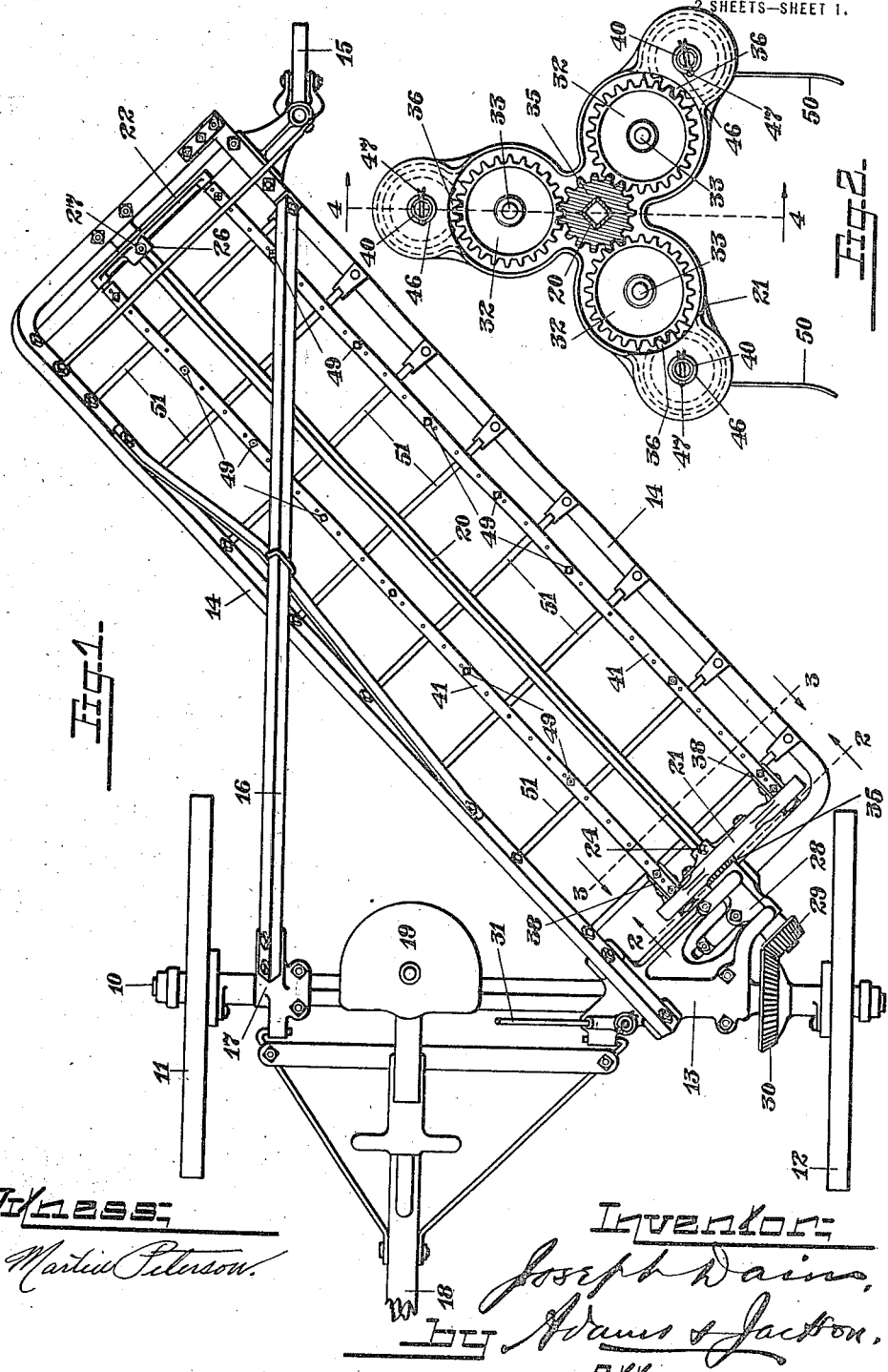

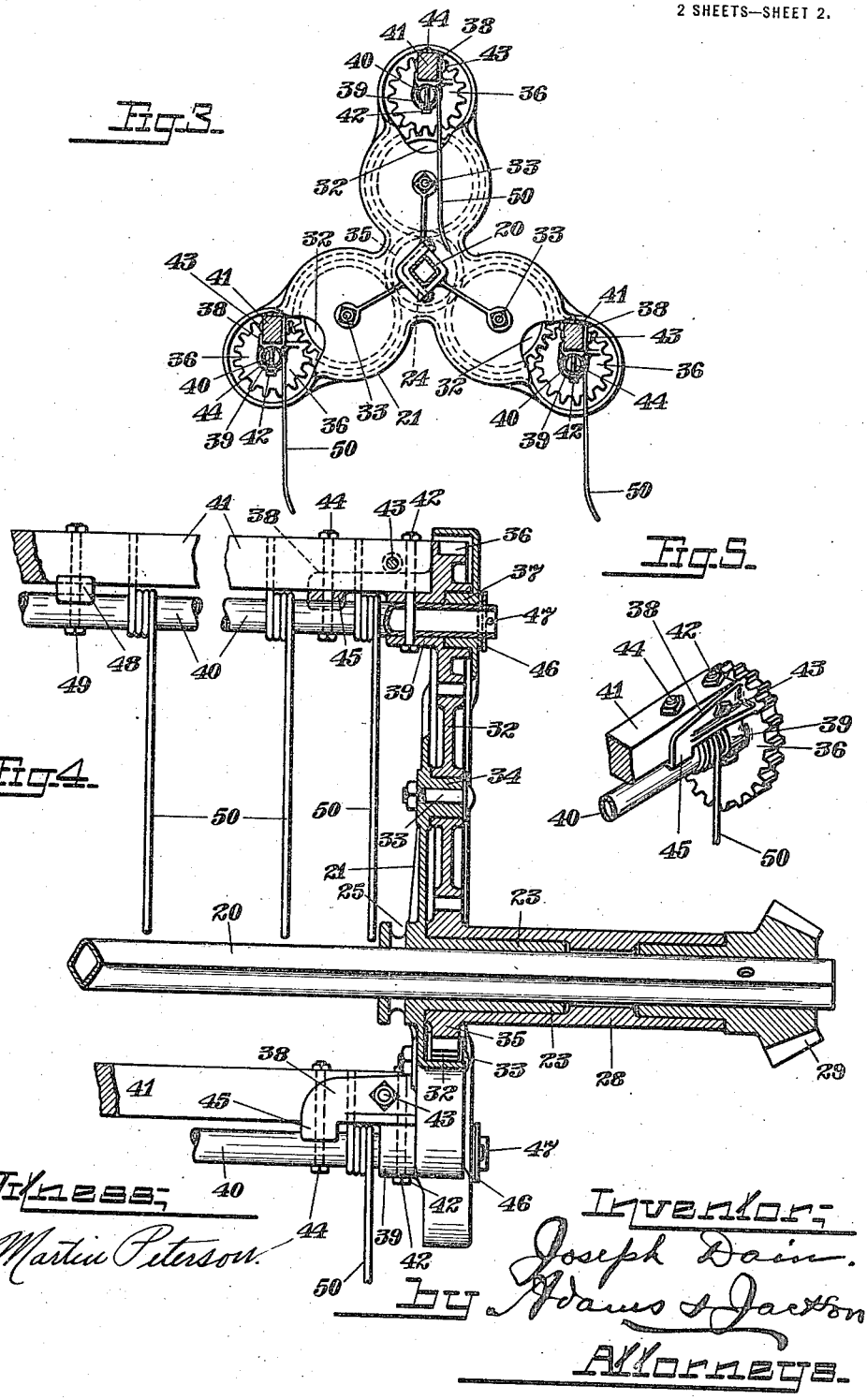

UNITED STATES PATENT OFFICE.

JOSEPH DAIN, OF MOLINE, ILLINOIS, ASSIGNOR TO DAIN MANUFACTURING COMPANY OF IOWA, OF OTTUMWA, IOWA, A CORPORATION OF IOWA.

ROTARY HAY-RAKE.

1,283,475.　　　　　　　Specification of Letters Patent.　　　Patented Nov. 5, 1918.

Application filed January 17, 1916.　Serial No. 72,479.

*To all whom it may concern:*

Be it known that I, JOSEPH DAIN, a citizen of the United States, and a resident of Moline, in the county of Rock Island and State of Illinois, have invented certain new and useful Improvements in Rotary Hay-Rakes, of which the following is a specification, reference being had to the accompanying drawings.

My invention relates to rotary hay rakes, and it has for its object the provision of a new and improved form and arrangement of raking reel by virtue of which the rake teeth shall be more firmly held and braced. My invention is shown as applied to a side-delivery rotary rake of the general type shown in patent to me, No. 1,007,676, dated November 7, 1911, in which a gear system is provided for maintaining the rake teeth in substantially vertical operative position. It is one of the principal objects of my invention to provide a new and improved arrangement of connections between the tooth-carrying and controlling bars and the gears coöperating therewith for maintaining the teeth in vertical position so as to render the machine capable of use with an unusually bulky or heavy product, or upon rough and uneven ground where the teeth would meet with unusual resistance, or for turning windrows,—without undue likelihood of the parts being strained and distorted or otherwise injured. It is another object of my invention to improve rotary rakes in sundry details hereinafter pointed out. The preferred means by which I have accomplished my several objects as applied to a side-delivery rotary rake are illustrated in the accompanying drawings and are hereinafter specifically described. That which I believe to be new and desire to cover by this application is set forth in the claims.

In the drawings:—

Figure 1 is a top or plan view of a side-delivery rotary rake embodying my improved construction;

Fig. 2 is an enlarged detail, partly in section, being an end view of the front end of the reel as seen on line 2—2 of Fig. 1, but with the reel rotated to a slightly different position;

Fig. 3 is an enlarged detail, being a vertical section through the reel taken substantially at line 3—3 of Fig. 1, but with the reel rotated into the same position as that illustrated in Fig. 2;

Fig. 4 is a still more enlarged detail, being a longitudinal vertical section through the front end of the reel, being taken substantially on line 4—4 of Fig. 2; and Fig. 5 is a fragmentary perspective view showing the connections between one of the tooth-controlling gears and the coöperating bars by which the teeth are held in position.

Referring to the several figures of the drawings in which corresponding parts are indicated by the same reference characters,—

10 indicates an axle having mounted thereon carrying wheels 11—12 so connected with the axle as to cause its rotation upon the forward movement of the machine, but adapted to revolve in the reverse direction without causing a corresponding rotation of the shaft, this result being effected by any well-known mechanism not illustrated. Mounted at one end upon a bracket 13 which is revolubly mounted upon the axle 10 is a reel-frame 14 supported at its opposite end by a caster-wheel 15 of any approved type. The reel-frame 14 is further connected with the axle 10 by means of a truss-bar 16 connected to said frame and connected at its forward end to the axle 10 by means of a bracket 17 revolubly mounted on said axle. A tongue 18 is pivotally mounted upon the brackets 13—17 in any suitable manner for guiding the rake and serving as a base for a seat 19 suitably mounted thereon. A square tubular center reel-shaft 20 is fixedly mounted in reel-heads 21—22 which are revolubly mounted upon the reel-frame 14 at its opposite ends. The forward reel-head 21 is fixedly mounted upon the center reel-shaft 20 by means of a sleeve 23 preferably formed integrally with such head. An L-shaped bolt 24 (see Fig. 3) secured by means of nuts in a groove 25 (see Fig. 4) serves to hold the sleeve 23 and the head 21 in fixed position upon the shaft 20. The rear reel-head 22 is fixedly mounted upon the shaft 20 and revolubly mounted upon the rear end of the frame 14 by means of a sleeve 26 secured in position by an L-shaped bolt 27. The sleeve 23 is journaled in a sleeve 28 which is movably mounted upon the frame 14. The sleeve 28 also serves as a bearing for a bevel-pinion 29 fixed upon the front end of the reel-shaft 20 meshing with a bevel-gear 30 fixed upon the axle 10. Means is provided for holding the sleeve 28 against rotation and for moving it as desired relative to the bracket 13 upon which it is slidably mounted for throwing the bevel-pinion 29 into or out of mesh with the bevel-gear 30. Inasmuch as the means provided for this purpose comprising a hand-lever 31 and its coöperating parts is of any suitable design, preferably as illustrated in patent to me, No. 886,681, of May 5, 1908, it is not believed to be necessary to further describe the same herein.

The reel-head 21 comprises three radially-extending portions or arms. As best shown in Figs. 2 and 3, each of these arms comprises web portions and a peripheral flange portion, the web portion at the outer end of each arm being on the side away from the reel while the web portion at the inner end of each arm is located on the side adjacent to the reel. Each of the arms of the head 21 has revolubly mounted upon it a gear 32 held in position by a bolt 33 upon an outwardly-extending stud 34, the said three gears 32 meshing with a stationary gear 35 formed with or otherwise fixedly mounted upon the non-rotatable sleeve 28. Each of the arms has also revolubly mounted upon it a gear 36 which is supported in position by an inwardly-extending stud 37, the gears 36 meshing respectively with the gears 32. Each of the gears 36 is provided with an inwardly-extending bracket 38 comprising a sleeve portion 39 in alinement with the hollow stud 37 upon which the gear is mounted. In each of the sleeves 39 and alined hollow studs 37 is mounted one end of a hollow tooth-supporting bar 40, the opposite end of which is revolubly supported by the rear reel-head 22. Each of the brackets 38 provides a socket for the reception of the forward end of a bar 41, preferably of wood. The end of the bar 41 and the end of the bar 40 are held in the socket and the sleeve, respectively, of the bracket 38 by means of a bolt 42, the bar 41 being further secured in position by a bolt 43. The end of the bar 41 is still further secured relative to the gear 36 and relative to the bar 40 by means of a bolt 44 passing through said two bars and through a spacing block 45 forming a part of the bracket 38. The bar 40 is further secured relative to the head 21 by means of a washer 46 and pin 47 serving to hold the said bar 40 from withdrawal from the stud 37. The bars 40 and 41 are additionally braced relative to each other by spacing-blocks 48 and bolts 49 spaced at intervals therealong.

At the desired intervals the bar 40 is provided with spring teeth 50 of any approved type, in the construction shown such teeth being mounted upon the bars 40 by means of integrally-formed coils. The upper ends of the teeth above the coils extend through suitable openings through the bars 41, as is well understood in the art. Stripper-bars 51 are mounted upon the reel-frame 14 at intervals therealong for clearing the hay from the teeth 50, as is well understood.

When the rake is being drawn forward with the pinion 29 in mesh with the gear 30, the reel-heads 21—22 will be rotated carrying the tooth-supporting bars 40 about the central shaft 20, the gears 35, 32 and 36 serving to hold such bars against rotation while being revolved about the shaft 20. By my expedient of connecting the bars 41 directly to the gears 36, I have provided a very strong durable construction by the use of which a comparatively light structure is capable of withstanding the severe strains of use under trying conditions. In my construction the bars 40 and 41 mutually reinforce each other, making a much stronger construction than has heretofore been attained. By my arrangement the heavy torque upon the bar 40 is eliminated, the reinforcement serving to very materially strengthen the structure. So far as I am aware, I am the first in the art to provide for direct connection of the tooth-holding bar 41 with the coöperating means for holding the teeth against swinging out of vertical position, such connection being effected independently of the tooth-supporting bar 40, and my claims are to be construed accordingly. It will be understood that I do not wish to restrict myself to the precise form of structure shown except as hereinafter specifically claimed.

What I claim as my invention and desire to secure by Letters Patent, is—

1. In a rotary-rake, the combination with a reel-head and means for rotating the same, of a pair of bars extending longitudinally of the reel, one of said bars being connected at one end with said head, teeth connected with both of said bars, mechanism carried by the head for engaging and holding one of said bars so as to maintain the said teeth at all times in a substantially vertical position, and means for securing both of said bars directly to said mechanism.

2. In a rotary-rake, the combination with a reel-head and means for rotating the same, of a pair of bars extending longitudinally of the reel, one of said bars being connected at one end with said head, teeth connected with both of said bars, mechanism carried by the head for engaging and holding one of said bars so as to maintain the said teeth at all times in a substantially vertical position, and means for securing both of said bars directly to said mechanism and also securing the bars to each other.

3. In a rotary rake, the combination of a reel-head, means for rotating said head, a bar extending longitudinally of the reel connected at one end with said head, a tooth mounted on said bar, a second bar engaging said tooth for controlling the position of the tooth upon said first-named bar, a gear having direct rigid connection with both of said two bars, and means for holding said gear against rotation as said bars are revolved about the axis of said head.

4. In a rotary rake, the combination of a reel head, means for rotating said head, a bar extending longitudinally of the reel, a tooth revolubly mounted on said bar, a second bar engaging said tooth for controlling the position of the tooth upon said first-named bar, a gear revolubly mounted on said head, direct rigid connections between said gear and both of said two bars, and means for holding said gear against rotation as said bars are revolved about the axis of said head.

5. In a rotary rake, the combination of a reel head, means for rotating said head, a plurality of gears revolubly mounted on said head, a plurality of bars extending longitudinally of the reel and having direct rigid connection with said gears respectively, a series of teeth mounted on each of said bars, a plurality of other bars extending longitudinally of the reel adjacent to said first-named bars respectively and each engaging the teeth upon the adjacent first-named bar for controlling the position of the teeth thereon, direct rigid connections between said second-named bars and said gears respectively, and means for holding said gears against rotation relative to each other as said bars are revolved about the axis of said head.

6. In a rotary rake, the combination of a reel-head, means for rotating said head, a pivoted member mounted on said reel-head, a bar extending longitudinally of the reel connected at one end with said member, a tooth mounted on said bar, a second bar having a direct rigid connection with said member and engaging said tooth for controlling the position of the tooth upon said first-named bar, and means engaging said pivoted member for holding said bars against rotation relative to each other as they are revolved about the axis of said head.

7. In a rotary rake, the combination of a reel-head, means for rotating said head, a member revolubly mounted on said reel-head comprising a sleeve concentric with the axis of the member upon the head and a socket eccentric of said axis, a bar extending longitudinally of the reel mounted at one end in said sleeve, a tooth mounted on said bar, a second bar mounted at one end in said socket and engaging said tooth for controlling the position of the tooth upon said first-named bar, a bolt passing through both of said bars securing them in position upon said member, and means for holding said bars against rotation relative to each other as they are revolved about the axis of the head.

8. In a rotary rake, the combination of a reel-head, means for rotating said head, a gear revolubly mounted on the inner face of said reel-head, a bar extending longitudinally of the reel rigidly connected at one end with said gear, a tooth mounted on said bar, a second bar also rigidly connected at one end with said gear and engaging said tooth for controlling the position of the tooth upon said first-named bar, and gearing mounted on the outer face of said head adapted to engage said first-named gear for holding said bars from rotating relative to each other as they are revolved about the axis of said head.

9. In a rotary rake, the combination of a reel-head, means for rotating said head, a bar extending longitudinally of the reel journaled at one end in a bearing provided by said head, a gear rigidly mounted on said bar and having a bearing on said head, a tooth mounted on said bar, a second bar also rigidly connected at one end with said gear and engaging said tooth for controlling the position of the tooth upon said first-named bar, and gearing mounted on the outer face of said head adapted to engage said first-named gear for holding said bars from rotating relative to each other as they are revolved about the axis of said head.

10. In a rotary rake, the combination of a rotary reel-head comprising a web portion at right angles to its axis of rotation, a peripheral flange extending from the outer face of said web portion, and a second web portion extending from the outer edge of said flange parallel with said first-named web portion, means for rotating said head, a gear revolubly mounted on the inner face of said second web portion, a bar extending longitudinally of the reel rigidly connected at one end with said gear, a tooth mounted on said bar, a second bar also rigidly connected at one end with said gear and engaging said tooth for controlling the position of the tooth upon said first-named bar, and gearing mounted on the outer face of said first-named web portion adapted to engage said first-named gear for holding said bars from rotating relative to each other as they are revolved about the axis of said head.

11. In a rotary rake, the combination of a reel-head comprising two web portions in different but parallel planes, a gear journaled to the outer face of one of said web portions, a second gear journaled on the inner face of the other web portion, the said gears being in mesh, a driving gear in mesh with said first-named gear, and a tooth-supporting bar fixedly connected with said second-named gear.

12. In a rotary rake, the combination of a reel-head comprising two web portions in different but parallel planes, a gear journaled to the outer face of one of said web portions, a second gear journaled on the inner face of the other web portion, the said gears being in mesh, a driving gear in mesh with said first-named gear, and two tooth-supporting bars each fixedly connected with said second-named gear.

JOSEPH DAIN.

Copies of this patent may be obtained for five cents each, by addressing the "Commissioner of Patents, Washington, D. C."